(12) United States Patent
Ohishi

(10) Patent No.: US 7,198,550 B2
(45) Date of Patent: Apr. 3, 2007

(54) PROCESS FOR FINISH-ABRADING OPTICAL-FIBER-CONNECTOR END-SURFACE

(75) Inventor: Michihiro Ohishi, Sagamihara (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/502,106

(22) PCT Filed: Jan. 21, 2003

(86) PCT No.: PCT/US03/01765

§ 371 (c)(1),
(2), (4) Date: Jul. 21, 2004

(87) PCT Pub. No.: WO03/067299

PCT Pub. Date: Aug. 14, 2003

(65) Prior Publication Data

US 2005/0152652 A1   Jul. 14, 2005

(30) Foreign Application Priority Data

Feb. 8, 2002   (JP) .............................. 2002-032675

(51) Int. Cl.
    *B24D 3/00* (2006.01)
(52) U.S. Cl. .......................... 451/41; 451/59
(58) Field of Classification Search ............ 451/41, 451/42, 43, 44, 59, 533
    See application file for complete search history.

(56) References Cited

U.S. PATENT DOCUMENTS

| 5,014,468 | A |   | 5/1991  | Ravipati et al. |        |
|-----------|---|---|---------|-----------------|--------|
| 5,147,416 | A |   | 9/1992  | Ohishi          |        |
| 5,152,917 | A |   | 10/1992 | Pieper et al.   |        |
| 5,199,227 | A |   | 4/1993  | Ohishi          |        |
| 5,304,223 | A |   | 4/1994  | Pieper et al.   |        |
| 5,631,986 | A | * | 5/1997  | Frey et al.     | 385/78 |
| 5,679,067 | A |   | 10/1997 | Johnson et al.  |        |
| 6,165,061 | A | * | 12/2000 | Fujii et al.    | 451/533 |
| 6,165,239 | A |   | 12/2000 | Hedrick et al.  |        |
| 6,179,887 | B1 |  | 1/2001  | Barber, Jr.     |        |
| 6,280,489 | B1 | * | 8/2001 | Horie et al.    | 51/307 |
| 6,398,826 | B1 | * | 6/2002 | Fujii et al.    | 51/295 |
| 6,443,827 | B1 |  | 9/2002  | Ryoke et al.    |        |
| 6,615,499 | B1 | * | 9/2003 | Matsuzawa et al.| 51/309 |
| 6,783,434 | B1 | * | 8/2004 | Akahori et al.  | 451/41 |
| 2004/0007690 | A1 | * | 1/2004 | Snider et al. | 252/79.1 |

FOREIGN PATENT DOCUMENTS

| EP | 0 664 187 A1 | 7/1995  |
| JP | 9-057632     | 3/1997  |
| JP | H9-248771    | 9/1997  |
| JP | H10-71572    | 3/1998  |
| JP | H11-333731   | 12/1999 |

(Continued)

*Primary Examiner*—Jacob K. Ackun, Jr.

(57) ABSTRACT

To provide a process for finish-abrading an optical-fiber-connector end-surface without generating abrasion scratch on an abraded surface of optical fiber, nor generating an adherent substance. A process for finish-abrading an optical-fiber-connector end-surface which comprises a step of abrading an optical-fiber-connector end-surface with using an abrasive film (100) composed of abrasive grains (103) fixed on a film-form substrate (101), in the presence of a lubricating liquid, wherein the lubricating liquid is an aqueous solution containing a hydrophilic surfactant.

13 Claims, 2 Drawing Sheets

FOREIGN PATENT DOCUMENTS

| | | |
|---|---|---|
| JP | H11-333732 | 12/1999 |
| JP | 2000-354970 | 12/2000 |
| JP | H2001-179640 | 7/2001 |
| WO | WO 92/13680 | 8/1992 |
| WO | WO 96/27189 | 9/1996 |
| WO | WO 99/59778 | 11/1999 |
| WO | WO 00/13853 | 3/2000 |
| WO | WO 01/45903 A1 | 6/2001 |

* cited by examiner

PROCESS FOR FINISH-ABRADING OPTICAL-FIBER-CONNECTOR END-SURFACE

BACKGROUND

The present invention relates to a process for finish-abrading an end-surface of optical fiber equipped with a ferrule, that is, an optical-fiber-connector end-surface.

Conventionally, an optical-fiber-connector which can be easily removed is widely used for connection of optical fibers in optical fiber communication network. In the connection at the optical-fiber-connector, end-surfaces of the optical-fiber-connector made of optical fiber and a covering portion (ferrule) for covering the optical fiber, are allowed to directly abut each other. Therefore, the optical characteristics at the time of connection, particularly connection loss, depend on the processing properties and precision of an optical-fiber-connector end-surface.

An optical-fiber-connector end-surface is processed through several abrasion steps. Usually, the steps of removing adhesives, abrading to curved surface, secondary-abrading, and finish-abrading are conducted. The finish-abrading means abrasion at the final stage conducted with using abrasive grains of the smallest size (a grain size of 5 to 1000 nm), thereby surface roughness Ra of not more than 5 nm is provided.

Quality of the optical-fiber-connector end-surface is influenced by processing properties and precision in the final finishing abrasion step. In other words, major factors for connection loss of the optical fiber are degree of finishing roughness of the end-surface and its inclination.

In the step of finish-abrading an optical-fiber-connector end-surface, superfine silica and the like was used as free abrasive grains in the past. However the process using free abrasive grains is complicated in work, so an abrasive film composed of abrasive grains fixed on a film-form substrate, is widely employed at present.

The abrasive grains are fixed by a binder, and an abrasive layer, which has abrasive grains and a binder, is usually formed on a film-form substrate. Finish-abrading of an optical-fiber-connector end-surface is conducted by applying the optical-fiber-connector end-surface to an abrasive surface of the abrasive film and rubbing with a predetermined amount of pressure.

Japanese Patent Laid-open Publication No. 248771/1997 discloses an abrasive tape for an optical-fiber-connector end-surface that has an abrasive layer containing abrasive grains and a binder on a substrate, the abrasive grains being silica particles having an average particle size of 5 to 30 nm. Japanese Patent Laid-open Publication No. 71572/1998 discloses an abrasive tape for optical fiber that has a primer layer and an abrasive layer containing abrasive grains and a binder on a substrate, the abrasive grains being alumina-silica composite particles having an average particle size of 10 to 700 nm.

However, when abrasive grains of fine size are employed, a long period of time for abrading is necessary. Further, an abrasive material of fine grade has a problem of loading. The term "loading" means that spaces between abrasive grains are filled with abrasion dusts that protrude to inhibit abrasive ability.

In case when an optical-fiber-connector end-surface is abraded by using an abrasive material of which surface is flat, particles of abrasion dusts stay between abrasive grains, thereby abrasive grains become poor in cutting ability. The abrasive material described in the above publications has a flat abrasive surface, and cutting ability easily decreases. Further, a liquid used as coolant or lubricant hardly works between an abrasive material and an optical-fiber-connector end-surface, a part of the abrasive layer adheres to an abraded surface of the optical-fiber-connector, and it is complicated in work for removing.

Japanese Patent Laid-open Publication No. 33372/1999 discloses an abrasive tape for an optical-fiber-connector end-surface which has an abrasive layer containing abrasive grains and a binder on a substrate, the abrasive grains being silica particles having an average particle size of 5 to 30 nm, the abrasive layer being formed with cracks of network structure, so that abrasion dusts can be recovered on the abrasive tape.

Japanese Patent Laid-open Publication No. 2001-179640 discloses an abrasive material for an optical-fiber-connector end-surface which has an abrasive layer containing abrasive grains and a binder on a substrate, the abrasive layer having three-dimensional structure constructed with a plurality of regularly arranged three-dimensional elements having a predetermined shape. The abrasive layer of such three-dimensional structure easily let abrasion dusts out, and is resistant to loading and excellent in durability. Further, a smear hardly adheres on an abraded surface, and frequency in generation of abrasion scratch is also very low.

However, in order to control generation of abrasion scratch more effectively, silica particles have to be used as abrasive grains, particle size have to be made small, and a binder contained in an abrasive layer have to be made soft. Although generation of abrasion scratch was effectively controlled in this case, it was newly discovered that adherent substance was generated on an abraded surface of optical fiber with certain frequency.

If the adherent substance on an abraded surface of optical fiber is left as it is, connection loss becomes large, whereas a cleaning step for removing it, results in additional labor. Therefore, it is generally desired a process for finish-abrading an optical-fiber-connector end-surface without generating abrasion scratch on an abraded surface of optical fiber, nor generating adherent substance.

The present invention has been made to solve the aforesaid problems of the prior art and an object thereof is to provide a process for finish-abrading an optical-fiber-connector end-surface without generating abrasion scratch on an abraded surface of optical fiber, nor generating adherent substance.

SUMMARY

The present invention provides a process for finish-abrading an optical-fiber-connector end-surface which comprises a step of abrading an optical-fiber-connector end-surface with using an abrasive film composed of abrasive grains fixed on a film-form substrate, in the presence of a lubricating liquid, wherein the lubricating liquid is an aqueous solution containing a hydrophilic surfactant. The wording "hydrophilic" means that the surfactant has strong interaction with water. Specific examples of the hydrophilic surfactant include an anionic surfactant such as RCOONa, $RSO_3Na$, and $RSO_4Na$, wherein R represents a lipophilic group, a nonionic surfactant having a HLB value of not less than 8, and the like.

DETAILED DESCRIPTION

As described above, finish-abrading of an optical-fiber-connector end-surface, is conducted by applying the optical-fiber-connector end-surface to an abrasive surface of the abrasive film, and rubbing while applying a predetermined amount of pressure.

Figure 1:
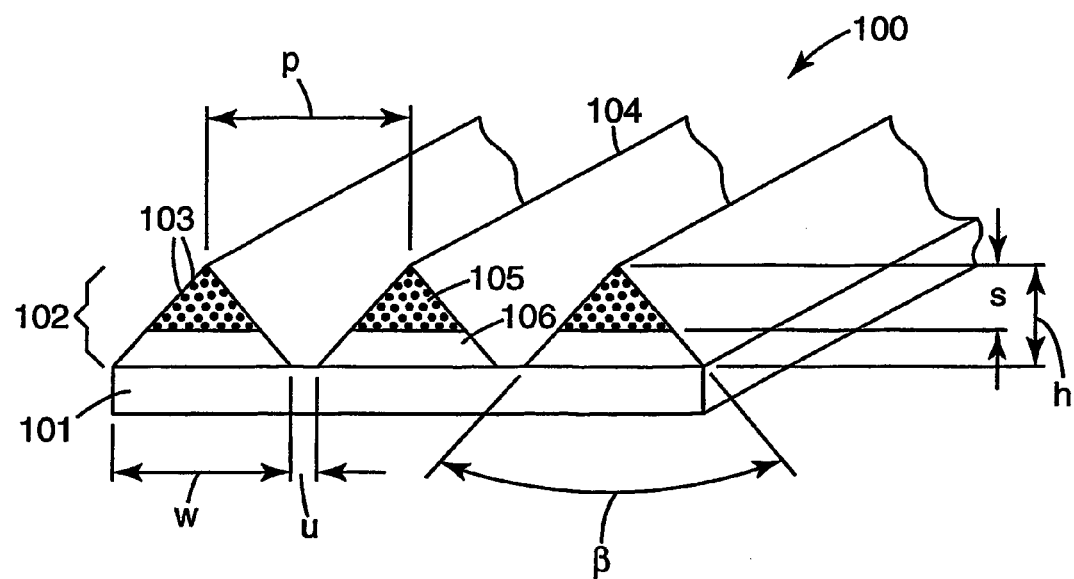
FIG. 1 is a perspective view showing an embodiment of an abrasive film used in a process of the present invention.

A non-limiting example of the abrasive film as used in the finish-abrading step is abrasive films comprising a three-dimensional structure. Specific examples of such an abrasive film are described in WO92/13680, WO96/27189, Japanese Patent Laid-open Publication No. 2001-179640, and the like. FIG. 1 is a perspective view showing an embodiment of the abrasive film preferred to be used in a process of the present invention.

The abrasive film 100 is an abrasive material which has a substrate 101 and an abrasive layer 102 applied on a surface of the substrate. The abrasive layer 102 contains matrix of a binder and abrasive grains 103 dispersed therein.

The abrasive layer is formed by shaping and solidifying a slurry containing a plurality of abrasive grains dispersed in the binder which is in an unhardened or ungelated state, i.e. the slurry is fixed to have a predetermined shape.

Size of the abrasive grains may vary depending on the type of the abrasive grains or the intended use of the abrasive material. For example, the grain size is 1 to 500 nm, preferably 5 to 200 nm for the finish-abrading. Preferable material for the abrasive grains includes silica, aluminum oxide, and silicon carbide. Particularly preferable one among these is silica. This is because silica is the same in material as conventional optical fiber, and it hardly damages an abraded surface of the optical fiber.

The binder is hardened or gelated to form the abrasive layer. It is preferred that the abrasive layer is formed so as to become comparatively soft in case of the finish-abrading. For example, Young's modulus of the binder which forms matrix of the abrasive layer, is adjusted to 0.1 to 50 kg/mm$^2$, preferably 0.5 to 40 kg/mm$^2$. If the Young's modulus of the binder is less than 0.1 kg/mm$^2$, abrasive grains hardly inroad the surface to be abraded, and cutting ability becomes poor. If it is more than 50 kg/mm$^2$, cushioning in contact between the abrasive grains fixed by the binder and the surface to be abraded becomes poor, and abrasion scratch is easily generated on an abraded surface of the optical fiber.

As the binder, variety of resins, for example, a thermo-curable resin, a thermoplastic resin, and a radiation curable resin may be employed. Preferred examples of the binder include an epoxy resin, and a urethane resin.

The binder may be radiation curable. The radiation curable binder is a binder that is at least partially hardened or is at least partially polymerized by radiation energy. Depending on the binder to be used, an energy source such as heat, infrared radiation, electron beam radiation, ultraviolet radiation, or visible light radiation is used.

Typically, these binders are polymerized by free radical mechanism. Preferred examples of the radiation curable binder are selected from the group consisting of acrylated urethane, acrylated epoxy, aminoplast derivative having an α,β-unsaturated carbonyl group, ethylenic unsaturated compound, isocyanurate derivative having at least one acrylate group, isocyanate having at least one acrylate group, and mixture thereof.

The abrasive layer 102 has three-dimensional structure constructed with a plurality of regularly arranged three-dimensional elements 104 having a predetermined shape. The three-dimensional elements 104 each have a prismatic shape formed of a laterally-placed triangular prism. Top angle β of the three-dimensional element 104 is typically 30 to 150°, preferably 45 to 140°.

Ridges on the top of the three-dimensional elements 104 are located on a plane parallel to the surface of the substrate substantially over an entire region of the abrasive material. In FIG. 1, the symbol h represents height of the three-dimensional element from a surface of the substrate. The height h is typically 2 to 600 μm, preferably 4 to 300 μm. Variation of height of the top lines is preferably less than 20%, more preferably less than 10%, of height of the three-dimensional element 104.

The three-dimensional element 104 preferably has two-layered structure including top portion 105 made of a layer containing abrasive grains and a binder, and foot portion 106 made of a binder. In FIG. 1, the symbol s represents height of top portion of the three-dimensional element. The height s is, for example, 5 to 95%, preferably 10 to 90%, of the height h of the three-dimensional element.

Typically, the three-dimensional elements 104 are arranged in a stripe pattern. In FIG. 1, the symbol w represents length of short bottom side of the three-dimensional element (width of the three-dimensional element). The symbol p represents distance between tops of adjacent three-dimensional elements. The symbol u represents distance between long bottom sides of adjacent three-dimensional elements. The length w is, for example, 2 to 2000 μm, preferably 4 to 1000 μm. The distance p is, for example, 2 to 4000 μm, preferably 4 to 2000 μm. The distance u is, for example, 0 to 2000 μm, preferably 0 to 1000 μm.

Length of the three-dimensional element may extend substantially over an entire region of the abrasive material. Alternatively, length of the three-dimensional element may be cut to suitable length. Ends of the three-dimensional elements may be either aligned or non-aligned. The ends of the prismatic three-dimensional elements may be cut at an acute angle from its bottom to form house shape having four inclined surfaces in case that stronger cutting ability is required.

The abrading step may be conducted according to a conventional method under conventional conditions. For example, an abrasive machine in which edge-abrasion is automatically conducted in case that an optical-fiber-connector and an abrasive film are mounted, is commercially available.

Water is conventionally employed as a lubricating liquid in conducting abrasion. This is because abrasion dusts are easily removed by water flow, and a cooling effect is also obtained. In the present process, an aqueous solution containing a surfactant is employed as a lubricating liquid instead of water, so that generation of adherent substance on an abraded surface of optical fiber is controlled.

A hydrophobic group of the surfactant is oriented to surfaces of the abrasive layer and the abrasion dusts, a hydrophilic group thereof is oriented to the contrary when a surfactant is added to the water to be used as a lubricating liquid, therefore a layer of the surfactant in molecular order is formed. Due to layers made of the surfactant and water, directly contacting area during abrasion between abrasive grains and the surface to be abraded is reduced, dispersion of abrasion dusts into the lubricating liquid is improved, re-adhering to the surface to be abraded is controlled, and an abraded surface is kept clean.

As the surfactant, it is preferred that hydrophilic surfactants, particularly an anionic surfactant and a nonionic surfactant are employed. Preferred nonionic surfactant includes those having a HLB value of 8 to 20, particularly 10 to 20. If the HLB value of the surfactant is less than 8, the above described advantage is not obtained because the lubricating liquid tends to form without emulsion.

Preferred examples of the anionic surfactant include alkylbenzene sulfonate. Specifically, sodium dodecylbenzene sulfonate is preferred. The preferred examples of the nonionic surfactant include polyoxyalkylene nonyl phenyl ether, such as polyoxyethylene nonyl phenyl ether and oxyethylene oxypropylene block copolymer.

The surfactant is contained in the lubricating liquid in an amount of 0.5 to 20% by weight, preferably 1.0 to 15% by weight, more preferably 1.0 to 10% by weight. If the content of the surfactant is less than 0.5% by weight, the effect of controlling adherence becomes poor. If it is more than 20% by weight, the lubricating liquid becomes viscous, and abrasion error may occur.

EXAMPLES

The present invention will be described in more detail by way of the following examples. However, the present invention is not limited by these examples.

An abrasive material coating liquid was prepared by mixing the components shown in Table 1.

TABLE 1

| Components | Weight (g) | Non-volatile content (%) | Dry weight (g) |
|---|---|---|---|
| Organosilica sol in isopropanol ("IPA-ST" available from Nissan Kagaku K.K., average particle size of 10 to 20 nm) | 100.00 | 30 | 30.00 |
| Difunctional epoxyacrylate oligomer ("SP-1509" available from Showa Kohbunshi K.K.) | 4.20 | 100 | 4.20 |
| Monofunctional acrylate monomer ("M-101A" available from Toa Gosei K.K.) | 6.30 | 100 | 6.30 |
| Photopolymerization initiator ("IRGACURE 907" available from Ciba Specialty Chemicals K.K.) | 0.21 | 100 | 0.21 |
| Total | 110.71 | | 40.71 |

A lamination binder was prepared by mixing the components shown in Table 2.

TABLE 2

| Components | Weight (g) | Non-volatile content (%) | Dry Weight (g) |
|---|---|---|---|
| Monoacrylate monomer ("M-101A" available from Toa Gosei K.K.) | 46.66 | 100 | 46.66 |
| 75:25 mixture of difunctional epoxyacrylate oligomer ("SP-1509" available from Showa Kohbunshi K.K.) and monoacrylate monomer ("M-101A" available from Toa Gosei K.K.) | 53.34 | 100 | 53.34 |
| Photopolymerization initiator ("IRGACURE 907" available from Ciba Specialty Chemicals K.K.) | 2.00 | 100 | 2.00 |
| Total | 102.00 | | 102.00 |

A mold sheet made of polypropylene and having recesses with a shape of inverted three-dimensional elements shown in FIG. 1 was prepared ("OFF-50" available from Minnesota Mining and Manufacturing Company). The abrasive material coating liquid was applied onto the mold sheet by means of a roll coater and dried at 50° for 5 minutes. The lamination binder was applied thereon.

A transparent polyester film having a thickness of 75 μm ("HPE POLYESTER FILM" available from Teijin Dupon Film K.K.) was superposed and pressed by a roll for lamination. Ultraviolet rays were radiated to harden the lamination binder. The hardened binder had a Young's modulus of about 8 kg/mm$^2$.

The mold sheet was removed and the resultant was cooled to room temperature to produce an abrasive film. The abrasive layer of the abrasive film has three-dimensional structure having a prismatic shape arranged in a stripe pattern as shown in FIG. 1. The dimensions thereof are shown in Table 3.

TABLE 3

| Symbol | Size (μm) |
|---|---|
| h | 25 |
| s | 15 |
| w | 50 |
| p | 50 |
| u | 0 |
| β | 90° |

This abrasive film was stamped out into a circular shape having a diameter of 110 mm to prepare an abrasive disk.

An optical-fiber-connector end-surface was abraded with the use of the obtained abrasive disk. The abrasion conditions were shown in Table 4.

TABLE 4

| | |
|---|---|
| Abrasive machine | "OFL-12" available from Seiko Denshi Kogyo Co., Ltd. |
| Load | Point 1 (about 2 kg/cm$^2$) |
| Number of abraded samples | 12 |
| Lubricating liquid | Aqueous solution containing surfactant (Table 5) |

The optical-fiber-connector, that is a sample to be abraded, was previously subjected to secondary-abrading by using "TRIZACT DIAMOND LAPPING FILM (3 mil, 0.5 micron)", before conducting finish-abrading. After the finish-abrading is conducted, an abraded surface of the optical fiber was observed by using a laser microscope, and checked whether the adherent substance was present or not. The results were shown in Table 5. Yield as shown in Table 5 means a proportion (%) of count of samples without adherent substance to 12 samples simultaneously abraded.

TABLE 5

| Surfactant | HLB | Run | Content (%) | Yield (%) |
|---|---|---|---|---|
| Pure water | — | 1 | 0 | 16.7 |
| Sodium dodecylbenzene sulfonate (Anionic surfactant, "NEOPELEX F-25" available from Kao K.K.) | — | 2 | 1 | 100.0 |
| | | 3 | 0.5 | 25.0 |
| Polyoxyethylene nonyl phenyl ether (Nonionic surfactant, "EMULGEN 985" available from Kao K.K.) | 18.9 | 4 | 1 | 83.3 |
| | | 5 | 0.5 | 33.3 |
| Oxyethylene oxypropylene block | 16 | 6 | 10 | 100.0 |

TABLE 5-continued

| Surfactant | HLB | Run | Content (%) | Yield (%) |
|---|---|---|---|---|
| copolymer (Nonionic surfactant, "PLURONIC F-68" available from Asahi Denka Kogyo K.K., Mn = 8350, EO = 80%) | | 7 | 2 | 100.0 |
| | | 8 | 1 | 83.3 |
| Oxyethylene oxypropylene block copolymer (Nonionic surfactant, "PLURONIC F-108" available from Asahi Denka Kogyo K.K., Mn = 15500, EO = 80%) | 16 | 9 | 1 | 83.3 |
| | | 10 | 0.5 | 41.7 |
| Oxyethylene oxypropylene block copolymer (Nonionic surfactant, "PLURONIC L-64" available from Asahi Denka Kogyo K.K., Mn = 2900, EO = 40%) | 8 | 11 | 10 | 25.0 |
| | | 12 | 2 | 16.7 |

Figure 2:
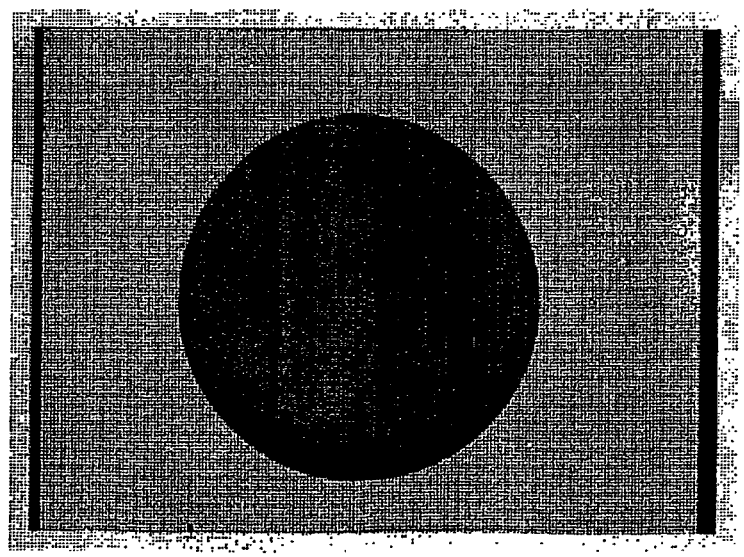
FIG. 2 is a microscope digital image showing an abraded surface with adherent substance of optical fiber.
Figure 3:
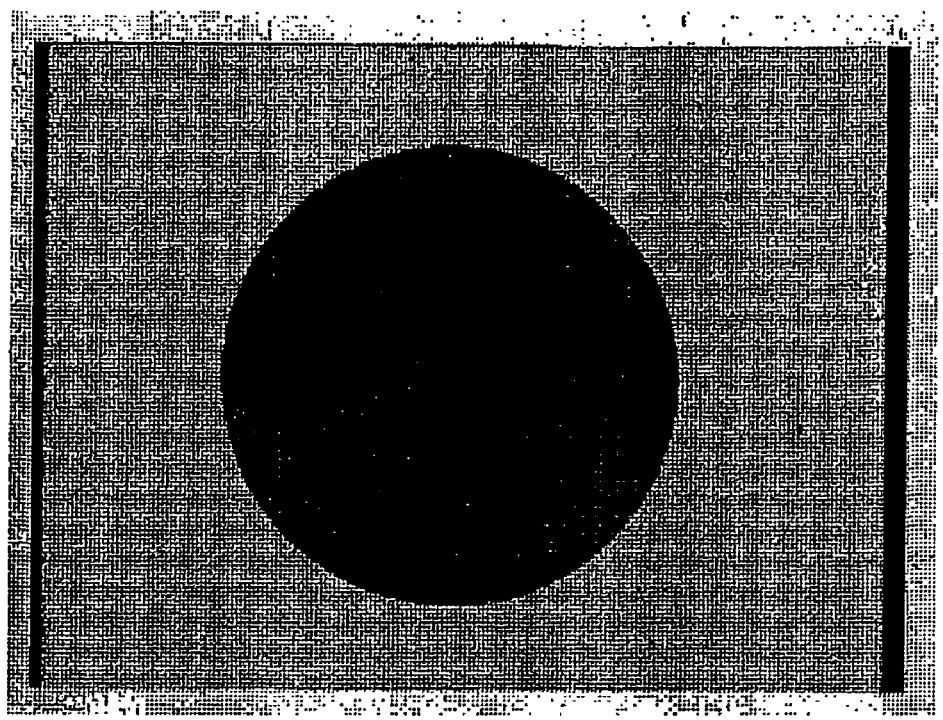
FIG. 3 is a microscope digital image showing an abraded surface without adherent substance of optical fiber.

FIG. 2 is a microscope photograph showing an abraded surface with adherent substance of the optical fiber (Run 1). FIG. 3 is a microscope photograph showing an abraded surface without adherent substance of the optical fiber (Run 7).

This results show that adherent substance was hardly generated on an abraded surface of optical fiber and yield for good article is improved by adding a surfactant to a lubricating liquid.

According to a process for finish-abrading an optical-fiber-connector end-surface of the present invention, no abrasion scratch is generated on an abraded surface of optical fiber, nor adherent substance is generated.

The invention claimed is:

1. A process for finish-abrading an optical-fiber-connector end-surface which comprises a step of abrading an optical-fiber-connector end-surface using an abrasive film composed of abrasive grains fixed on a film-form substrate, in the presence of a lubricating liquid, wherein the lubricating liquid is an aqueous solution containing a hydrophilic surfactant, and wherein the abrasive layer has a three-dimensional structure constructed with a plurality of regularly arranged three-dimensional elements having a predetermined shape.

2. The process according to claim 1, wherein the abrasive grains comprise silica having a grain size of 1 to 500 nm.

3. The process according to claim 1, wherein the binder has a Young's modulus of 1 to 500 MPa.

4. The process according to claim 1, wherein tops of said three-dimensional elements are constructed with lines parallel to a surface of the substrate, and the lines are located on a plane parallel to the surface of the substrate.

5. The process according to claim 1, wherein the surfactant is an anionic surfactant.

6. The process according to claim 1, wherein the surfactant is a nonionic surfactant having a HLB (hydrophilic lipophilic balance) value of 8 to 20.

7. The process according to claim 1, wherein the lubricating liquid has a content of a surfactant of 0.5 to 10% by weight.

8. The process according to claim 2, wherein the surfactant is an anionic surfactant.

9. The process according to claim 3, wherein the surfactant is an anionic surfactant.

10. The process according to claim 4, wherein the surfactant is an anionic surfactant.

11. The process according to claim 2, wherein the surfactant is a nonionic surfactant having a HLB (hydrophilic lipophilic balance) value of 8 to 20.

12. The process according to claim 3, wherein the surfactant is a nonionic surfactant having a HLB (hydrophilic lipophilic balance) value of 8 to 20.

13. The process according to claim 4, wherein the surfactant is a nonionic surfactant having a HLB (hydrophilic lipophilic balance) value of 8 to 20.

* * * * *